Figure 1:
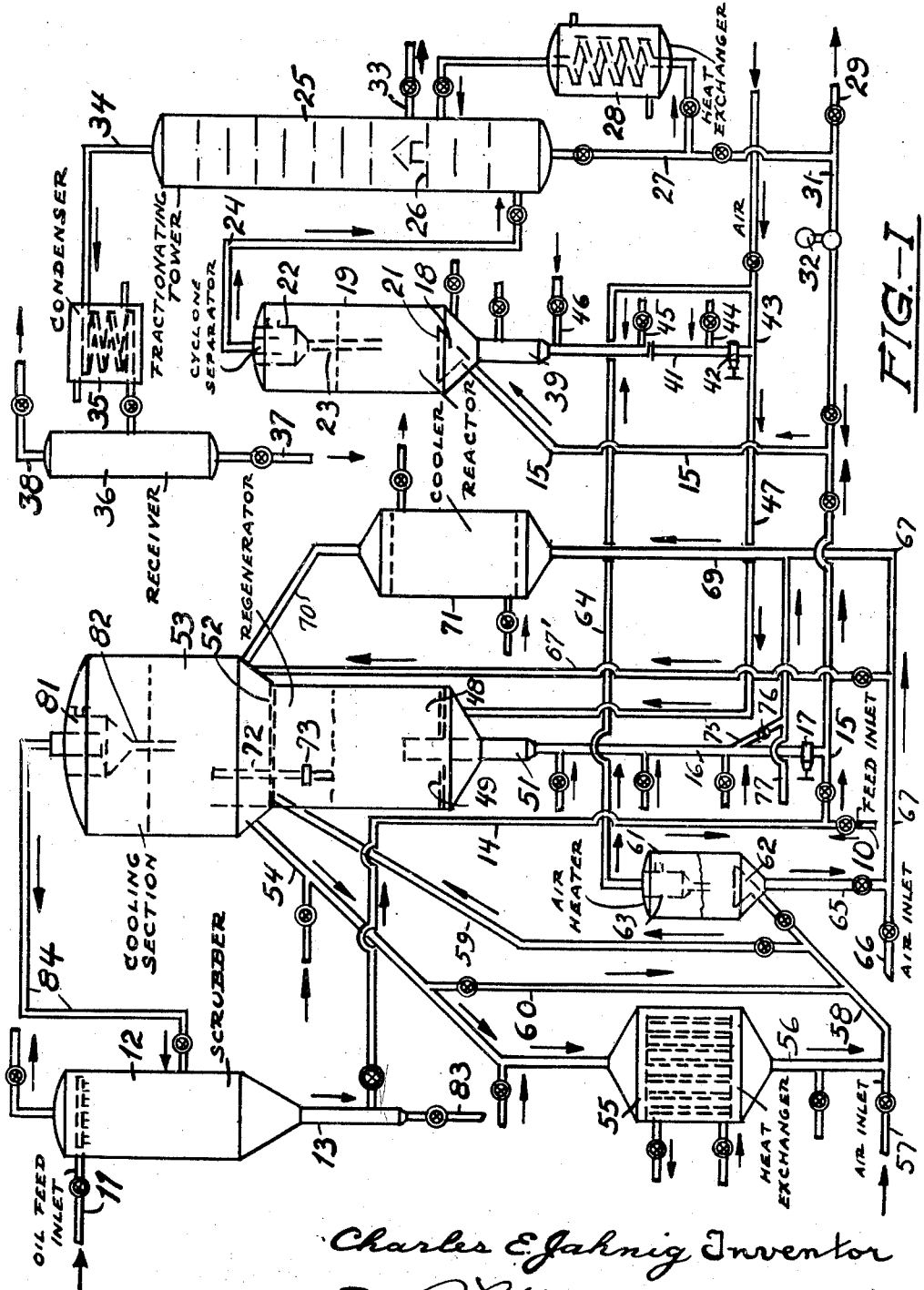

Patented May 13, 1947

2,420,542

UNITED STATES PATENT OFFICE 2,420,542

CARRYING OUT CHEMICAL REACTIONS IN THE PRESENCE OF FINELY-DIVIDED SOLIDS

Charles E. Jahnig, Roselle, N. J., assignor to Standard Oil Development Company, a corporation of Delaware Application December 24, 1942, Serial No. 470,003

12 Claims. (Cl. 196—52)

This invention relates to a process for carrying out chemical reactions in the presence of finely-divided solid material and pertains more particularly to a method of and apparatus for removing heat from gaseous reaction products containing entrained finely-divided solid material.

While the invention in its broader phases has a more general application, it is particularly adapted for the conversion of hydrocarbon oils at relatively high temperatures in the presence of finely-divided solid material. During such reactions the finely-divided material becomes contaminated with combustible deposits which impair the activity of the material for carrying out the reaction. As a result, it is the practice to regenerate the catalyst by burning the combustible deposits therefrom. This regeneration treatment liberates a considerable quantity of heat so that the gaseous combustion products are removed from the regenerator at relatively high temperatures, such as from 1000° F. to 1200° F. These hot, spent regeneration gases also contain small amounts of entrained finely-divided material which must be removed from the combustion gases prior to venting the spent combustion gases to the atmosphere.

The removal of such entrained solids may be accomplished by suitable separating devices, such as cyclone separators, electrical precipitators, liquid scrubbing towers, or by other conventional devices.

If the separation of the entrained solids is carried out while the spent combustion gases are at a high temperature level, the cost of equipment necessary to effect the separation is materially increased because of the necessity of providing metal in the separating equipment which will withstand the high temperatures and also because of the large volumes of gases passing through the separators due to the high temperature.

In view of this, there are substantial advantages gained by first cooling the gases prior to passing the same through the separating devices. This not only reduces the cost of material by reducing the amount of metal and the size of the equipment necessary to effect the separation but also improves the efficiency of the separators, since the cooler gases contain higher concentrations of entrained solids per cubic foot than is the case when the gases are at the higher temperatures.

However, if the cooling of the gases is carried out by conventional heat exchangers, the presence of the entrained powders gives rise to erosion difficulties. If the cooling is carried out by injection of a cooling gas, the amount of gases passing through the separating devices is increased so that no substantial reduction in the size of the separating equipment can be realized.

One of the primary objects of this invention is to reduce the cost of separating solid material from highly heated gases, such as spent combustion gases, from the regenerating chamber.

Another object of the invention is to provide an improved method of cooling hot gases containing entrained solids prior to the separation of the solids therefrom.

Another object of the invention is to provide an improved method of recovering heat from hot gases containing entrained solids.

Other objects and advantages of the invention will be apparent from the detailed description hereinafter.

In accordance with the broader phases of this invention, the hot gases containing entrained solids are passed through a layer of finely-divided solids which is maintained at a relatively low temperature so that the heat of the gases is absorbed by the layer of cool solids through which the gases pass.

The solids contained in the layer may be maintained at the desired temperature either by the provision of internal cooling tubes positioned within the layer or by continuously withdrawing a portion of the solid material, cooling the withdrawn material and again returning it to the cooling zone. The heat absorbed by the layer of finely-divided material within the cooling zone may be transferred to the reactants or may be utilized for preheating the air employed for regeneration, or for other purposes.

In accordance with one of the preferred embodiments of the invention, a portion of the finely-divided solid material is withdrawn from the reaction or regenerating zone, cooled and then passed into the cooling zone to extract heat from the hot gases leaving the zone. When operating in this manner, the solid material from the cooling zone may be returned to the reaction or regenerating zone. When following this procedure, the finely-divided material circulates from the cooling zone through the reaction or regenerating zone, then through an external heat exchanger and again back to the initial cooling zone.

In most instances, it is preferred to employ as a cooling medium a finely-divided solid material of the same composition as that used in carrying out the reaction so as to avoid intermixing of solids of two different compositions. However, it is possible to use a solid for effecting the cooling which is of different composition from that used for carrying out the reaction, providing the two solids are of different size or density so that the two materials may be readily separated from each other.

Figure 2:
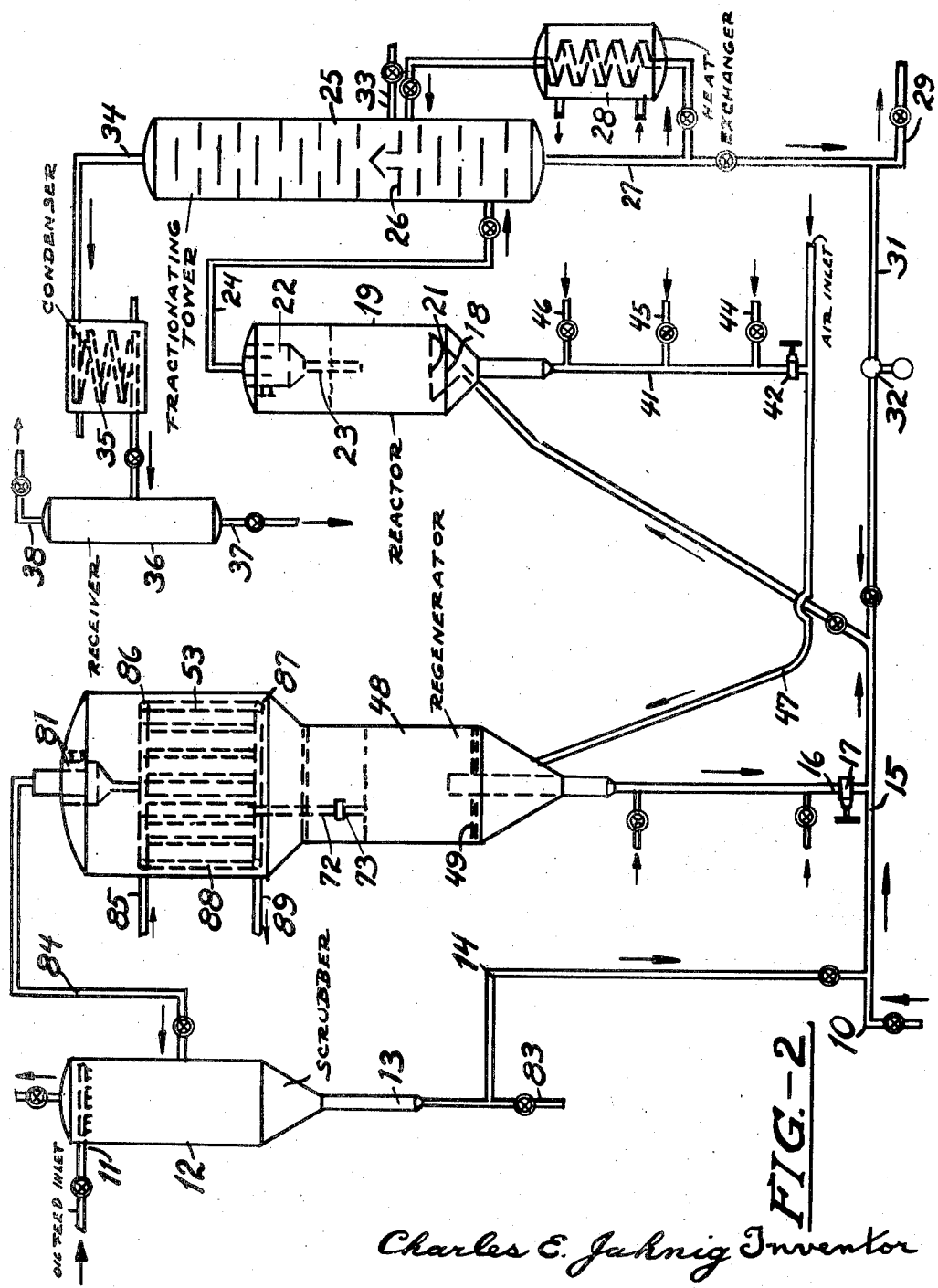

Having set forth the general nature and objects, the invention will be better understood from the more detailed description hereinafter, in which the invention will be described as applied to the catalytic cracking of hydrocarbon oils in the presence of finely-divided cracking catalyst in which the invention finds particular application. In the detailed description reference will be made to the accompanying drawings wherein:

Fig. 1 is a diagrammatic illustration of an apparatus for catalytic cracking embodying the present invention; and Fig. 2 is a modified form of apparatus suitable for carrying the invention into effect.

Referring particularly to Fig. 1, the oil to be cracked, which may be a clean condensate oil such as a gas oil, kerosene or naphtha, or a residual oil such as a topped or reduced crude, may be introduced into the system through line 10. In some cases, a part or all of the oil to be cracked may be passed through line 11 located at the upper lefthand side of the drawing and introduced into a scrubber 12 wherein it is used for scrubbing entrained solid material from precooled spent regeneration gas, as later described. In the latter case, the charging oil after passing through the scrubber 12 is withdrawn from the bottom thereof through line 13 and a transfer line 14 which merges with line 10.

The oil introduced into the system through line 10 may be either in liquid or vapor form, or a mixture of both, and may be at room temperature or preheated to the desired temperature. Oil introduced through line 11 should be in liquid state and should be substantially free of volatile constituents at the temperature maintained within the scrubber 12 to avoid intermixing of volatile oil constituents with the spent regeneration gases.

The oil introduced through line 10 or through line 11, or both, as the case may be, passes through line 15 wherein it intermixes with a finely-divided cracking catalyst discharging from conduit 16 through a feed valve 17. The catalytic material introduced into the line 15 should be in finely-divided condition and may have a particle size ranging, for example, up to 100 microns. In some cases, coarser materials may be employed. This catalytic material may comprise any suitable solid material capable of influencing the cracking reaction. Such materials may comprise, for example, the naturally active or activated clays and synthetic adsorptive gels comprising silica-alumina, silica-magnesia, alumina-boron oxide, and the like. The specific composition of the catalytic material employed in the reaction forms no part of the invention.

The amount of catalytic material introduced into the oil stream passing through line 15 should be sufficient to accomplish the desired effect and will vary depending upon the catalyst activity, temperature of the operation, the characteristics of the oil to be cracked and the extent of cracking desired. Furthermore, in many cases it is desirable to supply the hot catalytic material while at regeneration temperature, which is generally higher than reaction temperature, and to control the proportions of catalyst and oil so that the heat necessary for heating the oil to the desired reaction temperature and for carrying out the cracking operation is obtained by intermixing of the hot regenerated catalyst with the oil. In view of the above, it is not possible to specify the relative amounts of catalyst and oil which are necessary in all cases. In general, this ratio may vary between 2 and 20 or more parts of catalyst per part of oil by weight.

The catalyst-oil mixture formed in the line 15 discharges through some type of distributing device 18 positioned in the bottom of the reactor 19. In one form, the distributing device consists of a cone-shaped device. For example, distributing cone 18 is preferably provided with a perforated grid 21 in the upper end thereof through which the suspension of oil and catalyst passes into the main body of the reactor 19. The distributing cone 18 is preferably spaced from the outer shell of the reactor 19 to form an annular space from which catalytic material is continuously removed from the reactor, as later described. The reactor 19 is preferably of such diameter that the velocity of the oil vapors passing through the main body of the reactor is reduced to such a point that the catalytic material tends to separate into a relatively dense mass which is maintained in a fluidized, turbulent state by the upward passage of the oil vapors therethrough. When employing finely-divided catalytic material of the size previously mentioned, the velocity of the oil vapors passing upwardly through the reactor 19 should be preferably between 0.2 and 5 feet per second. Under carefully controlled conditions, the catalytic material separates within the reactor 19 with a relatively dense phase in the lower portion while the gases in the upper portion contain a relatively small concentration of finely-divided solid material. The cracking reaction may be carried out at temperatures ranging from 700° F. to 1100° F. or more, depending upon the degree of conversion desired, the type of product desired, and other factors. The time of residence of the oil vapors within the reactor 19 should be controlled to attain these ends and may range from 1 second to many minutes or more.

The cracked products after passing through the relatively dense layer of catalytic material within the reactor 19 are passed into a cyclone separator or other suitable separating device 22 which, as illustrated, is in the upper section of the reactor 19. The purpose of the cyclone separator 22 is to remove entrained powdered material contained in the cracked products prior to passing the same to the fractionating equipment. The catalytic material separated in the cyclone separator 22 may be returned to the reactor through line 23 below the level of the catalytic material contained therein. The cracked vapors after passing through the cyclone separator 22 are removed overhead from the reactor 19 through line 24 and passed to a fractionating tower 25 wherein the products undergo fractionation and condensation to separate various components therefrom and to scrub said products free of the remaining catalyst dust.

If desired, the fractionating tower 25 may be provided with a trap-out tray 26 for segregating the initial condensate formed in the bottom section of the tower from the lower boiling condensate formed in the upper portion of the tower. The initial condensate formed in the bottom section of the tower will normally contain some entrained catalytic material not removed by the cyclone separator 22 and it is therefore desirable in many cases to segregate the initial condensate containing the entrained solids from the remaining condensate. The initial condensate formed in the bottom section of the fractionating tower 25 may be removed therefrom through line 27. If desired, a portion of this condensate may be cooled by passing through a heat exchanger 28 and may be returned to the bottom portion of the fractionating tower to serve as a cooling medium to reduce the temperature of the cracked vapors to the dew point and below. The remaining portion of the condensate may be withdrawn from the system through line 29, or a part or all of this condensate may be recycled through line 31 and pump 32 to line 15 where it intermixes with fresh charge passing to the reactor 19. Condensate formed in the upper portion of the fractionating tower may be withdrawn from trapout tray 26 through line 33 and employed either as a heating fuel, Diesel fuel, kerosene, or the like, or it may be recycled to tower 25 or to the cracking unit for further conversion.

Vapors remaining uncondensed in the fractionating tower 25 are removed overhead through line 34 and passed to a condenser 35 in which the desired motor fuel distillate is condensed. Products from the condenser 35 then pass into a product receiver 36 in which separation of uncondensed gases from liquid distillate is carried out. The liquid distillate is removed from the receiver 36 through line 37 and may be subjected to any further finishing treatment desired for the production of the final market product. Uncondensed gases from the product receiver 36 are removed overhead through line 38 and may be subjected to further treatment for separation of higher boiling hydrocarbons from lower boiling hydrocarbons in any desired manner.

As previously mentioned, a portion of the catalytic material from the reactor 19 continuously passes through an annular passageway formed between the outer shell of the reactor 19 and the distributing cone 18 and discharges into a well 39 from which it continuously passes into conduit 41. If desired, an aerating and stripping gas may be introduced at spaced points around the annular space between the distributing cone 18 and the outer shell and in the well 39 in order to displace volatile hydrocarbon constituents remaining on the catalytic material prior to withdrawing the same from the reaction chamber. Spent catalytic material from the reactor 19 discharges through the conduit 41 through control valve 42 into an air stream passing through line 43.

In order to introduce the catalytic material from conduit 41 into the air stream 43 it is important to maintain the catalytic material in the conduit 41 in a freely flowing, fluidized condition and to this end an aerating gas, such as steam, spent combustion gases or the like, may be introduced at one or more spaced points in the conduit 41 through lines 44, 45 and 46.

Furthermore, in order to avoid the possibility of the air stream by-passing upwardly through the conduit 41 into the reactor 19 and to control the rate of flow of the catalytic material into the air stream, it is important that the pressure on the catalytic material passing through the control valve 42 into the air stream 43 should be at a pressure somewhat in excess of the pressure on the air stream in the line 43. To this end, the conduit 41 may serve as a standpipe for building up a fluistatic pressure on the solid materials between reactor 19 and the air stream 43. In order to accomplish this, it is important to maintain the fluidized mass within the column 41 in a freely flowing, fluidized condition. Under such conditions, the fluidized solid within the column 41 behaves in many respects as a liquid in that it tends to seek its own level and tends to develop a hydrostatic or fluistatic pressure capable of being exerted uniformly in all directions.

The spent catalytic material from the reactor 19 after being introduced into the air stream through line 43 is transferred through line 47 into the bottom section of a regenerating chamber 48 below a perforated grid 49. The suspension of air and spent catalytic material discharges upwardly through the perforated grid 49 into the main body of the regenerating chamber 48.

It is also preferred to reduce the velocity of the gases passing through the regenerator 48 so that the finely-divided catalytic material undergoing regeneration therein separates into a relatively dense layer of catalytic material which is maintained in a turbulent, fluidized state by the upward passage of the regenerating gas therethrough. To this end, the velocity of the regenerating gas may be of the order of from 0.2 to 5 feet per second, depending upon the size of the particles, as previously pointed out in connection with the reactor 19. The catalytic material is subjected to oxidation within the regenerator 48 to burn combustible deposits from said material formed during the cracking reaction. During the combustion a considerable quantity of heat is liberated within the regenerator 48. A portion of the catalytic material undergoing regeneration in the regenerator 48 is withdrawn through a vertical conduit 51 extending upwardly into the main body of the regenerator above the perforated grid 49. The catalytic material from the conduit 51 discharges into conduit 16 and is returned to the oil stream passing through line 15.

The bulk of the heat liberated during regeneration may therefore be transferred directly to the oil by maintaining a substantial temperature difference between regenerator 48 and reactor 19 and controlling the rate of circulation of the catalytic material through the reactor 19 and regenerator 48 so that the catalytic material from the regenerator carries the heat into the oil stream at the desired rate to maintain the reactor 19 at the desired temperature. The catalyst passing through the conduit 16 from the regenerator into the oil stream should be maintained in a freely flowing, fluidized state and to this end an aerating gas in small amounts may be introduced at one or more spaced points along the conduit. It is also desirable to construct the conduit 16 of sufficient height to develop a substantial fluistatic pressure within the conduit so as to maintain a material pressure differential between the regenerator 48 and the oil stream 15. This will tend to prevent the passage of the oil upwardly through the conduit 16 and will also permit ready control of the flow of regenerated catalyst into the oil stream.

The spent combustion gases from the regenerator 48 pass upwardly through a perforated grid 52 into a cooling section 53 containing a layer of finely-divided solid material maintained at a temperature materially below the temperature within said regenerating zone.

The velocity of the spent combustion gases from the regenerator 48 passing upwardly through the layer of cooled solid material in the cooling section 53 is preferably controlled as previously described with reference to regenerator 48 and reactor 19 to maintain a dense, fluidized layer of the solid cooling material contained therein. This solid layer is maintained in a turbulent, mobile state by the upward passage of the spent regeneration gas therethrough.

As illustrated in Fig. 1, the solid material within the cooling section 53 is maintained at the desired temperature by the continuous introduction of the cooled solid material into the cooling section and the continuous withdrawal of a suitable amount of the solid material from the cooling section.

According to one modification, a portion of the solid material within the cooling section 53 is withdrawn therefrom through line 54 and passed through a heat exchanger 55. The cooled material after passing through the heat exchanger 55 may then discharge through line 56 into an air stream 57. The cooled material is then returned to the cooling section 53 through lines 58 and 59.

The heat exchanger 55 may be of any suitable construction, such as a conventional tube exchanger, or it may be in the form of a waste heat boiler. Instead of cooling the solid material withdrawn from the cooling section 53 by passing it through the heat exchanger 55, a portion or all of the heat contained in this material may be utilized for preheating the air employed for regeneration. To this end, a part or all of the solid material withdrawn from the cooling section 53 through line 54 may be passed through line 60 into the air stream passing through line 57 and used for preheating the air passing to the regenerator. In this case, a mixture of air and solid material from the cooling section 53 may be passed to a settling chamber 61 in which the velocity of the air is reduced to permit separation of the solid material from the air. The settling chamber 61 may, for example, be constructed similar to the reactor 19. In this case, the air stream is discharged into the settling chamber 61 through a distributing cone 62 having a perforated plate at the upper end thereof. The air stream after passing through the perforated plate in the distributing cone 62 is reduced in velocity to permit separation of the solid material therefrom so that this material forms a relatively dense layer which is maintained in a turbulent state by the upward passage of the air therethrough. The air after passing through the layer of finely-divided material in the settling chamber 61 may then pass into a cyclone separator 63 or other suitable separating device for removing entrained solids therefrom. The entrained solids separated in the separator 63 may be returned to the settling chamber 61 below the level of the solid material therein.

The air after being preheated by contact with the solid material within the separating chamber 61 is removed from the cyclone separator 63 through line 64 which may merge with line 43 into which the spent catalytic material from the reaction chamber 19 discharges, as previously described. The solid material separated from the gases in the vessel 61 is withdrawn from the bottom thereof through line 65 which discharges into a gas stream passing through line 66. This suspension of gas and solid material may then be returned through line 67 directly to the cooling zone 53 via line 67'. If desired, a part or all of the solids after being utilized for preheating the air in the separator 61 may be passed through lines 67 and 69 to a heat exchanger 71 where it may be further cooled before being returned to the cooling section 53 through line 70. The amount of material retained in vessel 53 is regulated by means of line 72 and valve 73.

Instead of separately withdrawing the finely-divided solid material from the cooling section 53 and subjecting it to external cooling and thereafter returning it to the cooling section, as previously described, a portion of the solid material used as the cooling medium may be passed directly into the regenerator 48 through vertical conduit 72 interconnecting the cooling section 53 with the regenerator 48. In this case, a portion of the solid material from the cooling section 53 continuously passes through the conduit 72 and control valve 73 located therein into the main body of the catalytic material within the regenerator 48. When operating in this manner, a portion of the regenerated catalyst withdrawn from the regenerator 48 through conduit 16 is passed through conduit 75 and control valve 76 into a gas stream passing through line 77. The resulting gas-catalyst mixture then passes through line 69 to the heat exchanger 71 and thence to the cooling section 53.

I have shown the cooling section 53 positioned immediately above the regenerator 48 and of larger diameter than the regenerator. It will be understood, however, that, if desired, the cooling zone 53 may be separate and independent from the regenerator and the diameter may be larger or smaller than that of the regenerator. It is preferred to pass the regeneration gas through the cooling zone at a low velocity so as to form a dense layer of solid material therein, and as the volume of additional gas introduced into the cooling zone over and above that passing through the regenerating zone is relatively small and since the temperature is substantially lower, it follows that in most cases the diameter of cooling zone 53 will be the same or somewhat less than that of regenerator 48.

The temperature of the cooling medium maintained in the cooling section 53 is preferably controlled to reduce the temperature of the regeneration gas from regeneration temperature down to 500° F. or below. The regeneration temperature may, on the other hand, be from 1000° F. to 1200° F. or more.

The spent combustion gases from the regenerator after passing through the cooling section 53 are introduced into a cyclone separator 81 or other suitable separating device which, as illustrated, is located in the upper portion of the cooling section 53. Solid material separated from the spent combustion gases in the cyclone separator 81 may be returned to the cooling zone through conduit 82 below the level of the solid cooling medium maintained therein.

The regeneration gases after passing through cyclone separator 81 are transferred through line 84 to a further separating device for effecting final removal of entrained solid therefrom. As illustrated, this final purification is accomplished by means of a liquid scrubber in which the gases pass upwardly through the scrubber 12 countercurrent to the passage of liquid introduced at the top thereof.

As mentioned previously, this scrubbing liquid may be oil which is to be subjected to the cracking operation. However, other types of scrubbing media, such as water, may be used instead of oil. In the latter case, the liquid scrubbing medium after passing through scrubber 12 is removed from the system through line 83 and may be filtered or otherwise processed to recover the catalyst contained therein. Instead of using an oil scrubber for effecting final purification of the gas, an electrical precipitator, filter bags or other devices may be used for final purification of the gas prior to venting the same to the atmosphere.

Fig. 2 illustrates a more simple form of apparatus in which the solid cooling medium employed for cooling the regeneration gases is cooled by internal cooling tubes within the cooling zone. This avoids continuous removal of solid cooling material from the cooling zone, separately cooling it and returning it to the cooling zone.

The construction shown in Fig. 2 is of the same general type as that illustrated in Fig. 1 and similar elements have been identified by like reference characters. In Fig. 2, however, the cooling section 53 in the regenerator 48 is provided with a plurality of cooling tubes through which the cooling medium, such as oil, water, steam or the like, may be introduced. For example, the cooling medium may be introduced through line 85 to a tubular header 86 located in the top of the cooling section. A lower header 87 interconnected with the upper header by a plurality of vertical tubes 88 is also provided and the cooling medium is withdrawn from the lower header 87 through line 89. The cooling tubes 88 are preferably positioned circumferentially around the outside of the cooling section 53. The turbulent condition of the layer of cooling solids in the cooling section 53 permits rapid heat exchange between the cool fluid and the solid material contained in the cooling section without giving rise to localized temperature differences within the cooling zone. A conduit 72 having a control valve 73 interconnects the cooling section 53 with the regenerator 48, as illustrated in Fig. 1, so that a portion of the cooled solid material comparable to that separated from the spent regeneration gases may be continuously passed from the cooling section into the main portion of the regenerator 48.

From the foregoing description, it will be evident that the spent combustion gases from the regenerator are cooled to a materially lower temperature by passing through a dense, fluidized mass of solid material before passing to the separators, such as the cyclone separator 81 and the liquid scrubber 12. By cooling the gases in this manner, the volume of gases passing through the separator is reduced, thereby requiring smaller separating equipment, and since the termperature is lower the material requirements for the separating equipment are further reduced.

While this invention has been described with particular reference to a regeneration vessel, it should be understood that it can also be used on a reaction vessel to accomplish the same results.

Having described the preferred embodiment of the invention, it will be understood that it embraces such other variations and modifications as come within the spirit and scope thereof.

What is desired to be protected by Letters Patent is:

1. In a process for the regeneration of finely-divided solid material wherein said solid material is subjected to oxidizing conditions in a regenerating zone to remove combustible deposits formed thereon and wherein the regeneration gases removed from said regenerating zone are at a relatively high temperature and contain entrained solid material, the improvement in the process of separating the entrained solids therefrom which comprises passing the regenerating gases removed from the regenerating zone while substantially at regeneration temperature upwardly through a layer of finely-divided solid material maintained in a turbulent condition, passing a cooling fluid in indirect heat exchange with said layer of solid material to maintain the temperature thereof materially below the temperature of said regenerating zone whereby the temperature of said regeneration gas is materially reduced, and thereafter separating entrained solid material from the regenerating gas after passing through said layer.

2. In a process for the regeneration of finely-divided solid material wherein said solid material is subjected to oxidizing conditions in a regenerating zone to burn carbonaceous deposits contained thereon, the improvement in the method of recovering entrained finely-divided solid material from said regenerating gas which comprises passing the regenerating gas from said regenerating zone while substantially at regeneration temperature upwardly through a layer of finely-divided solid material, continuously removing a portion of the finely-divided solid material from said layer separate and independent from said gas stream, cooling the portion so withdrawn, thereafter returning the cooled portion to said layer and maintaining the temperature of said layer materially below the temperature maintained within said regenerating zone whereby said regeneration gas is cooled to a materially lower temperature, and thereafter separating entrained solids from the cooled regenerating gas.

3. In a process for regenerating finely-divided solid material wherein the finely-divided solid material to be regenerated is subjected to an oxidizing atmosphere to remove carbonaceous deposits contained thereon, the improvement in the method of recovering finely-divided solids entrained in said regenerating gas removed from said regenerating zone which comprises passing said regenerating gas upwardly through a layer of finely-divided solid material, continuously removing a portion of said solid material from said layer, passing an oxidizing gas employed in said regeneration in direct contact with the portion removed from said layer to thereby preheat said oxidizing gas and cool said solid material, returning the cooled solid material to the layer, and passing the preheated oxidizing gas to said regenerating zone.

4. In a process for regenerating finely-divided solid material containing combustible deposits wherein the finely-divided material is subjected to oxidizing conditions within a regenerating zone to thereby remove said combustible deposits therefrom, the improvement in the method of recovering entrained finely-divided solid material from the regenerating gas removed from said regenerating zone which comprises passing said regenerating gas from said regenerating zone upwardly through a layer of finely-divided solid material, continuously removing a portion of said solid material from said layer and passing it to said regenerating zone, continuously removing the finely-divided solid material from the regenerating zone, passing at least a portion of the finely-divided solid material removed from said regenerating zone through a cooling zone, thereafter returning said cooled finely-divided material to said first-named layer, controlling the temperature of said layer by the circulation of said finely-divided material to cool said regenerating gas to a temperature materially below the temperature maintained in said regenerating zone, and thereafter separating entrained solid material from said cooled regenerating gas.

5. In the process for the catalytic conversion of hydrocarbon oils wherein the oils are converted in the presence of a finely-divided conversion catalyst, wherein said finely-divided conversion catalyst continuously circulates through a conversion zone and a regenerating zone, and wherein said finely-divided catalytic material is subjected to oxidation in said regenerating zone to remove combustible deposits therefrom, the improvement which comprises passing regenerating gas from said regenerating zone and while substantially at regeneration temperature upwardly through a layer of finely-divided solid material, controlling the velocity of the regenerating gas passing through said layer to maintain said layer in a turbulent state, materially reducing the temperature of said regenerating gas during passage through said layer of finely-divided solid material, and thereafter passing the cooled regenerating gas in direct contact with the oil to be converted whereby said oil removes entrained solid material from the cooled regenerating gas and is preheated by contact with said gas.

6. In a process for regenerating finely-divided solid material containing combustible deposits wherein the finely-divided material is maintained in a turbulent, dense phase within a regenerating zone and subjected to oxidizing conditions to thereby remove said combustible deposits therefrom, and wherein finely-divided material, freed from said combustible deposits, is removed in a dense phase from the said regenerating zone through the lower end thereof, and a stream of regeneration gases containing entrained solids in a relatively smaller concentration than in said dense phase leaves the upper portion of said regeneration zone, the improvement in the method of cooling said stream of gases which consists in passing the same through a bed of finely-divided solids maintained in a turbulent condition and at a temperature materially lower than the temperature maintained within said regeneration zone.

7. In a process according to claim 6, wherein the temperature within the regeneration zone ranges from 1000° to 1200° F. and the stream of regeneration gases is cooled down to below approximately 500° F.

8. In a process for removing finely-divided entrained solid material from a stream of hot, gaseous products, the improvement which comprises passing said hot, gaseous products containing said entrained solid material from a reaction zone containing a layer of finely-divided solid material maintained in a turbulent condition superimposed by a gas phase containing a relatively low concentration of solids therein, through a second layer of finely-divided solid material maintained in a turbulent condition, controlling the temperature of said second layer to materially reduce the temperature of said gaseous products by continuously withdrawing a portion of the finely-divided solid material from said second layer separately and independently of the gas stream leaving said second layer, cooling the same and continuously returning the said cooled finely-divided material to said second layer, and removing entrained solid material from the gas stream leaving said second layer.

9. In a process according to claim 8 wherein the entrained solid material removed from the gas stream leaving said second layer is returned to said second layer.

10. In a process for removing finely-divided entrained solid material from a stream of hot, gaseous products, the improvement which comprises passing said stream of gaseous products directly from a reaction zone containing a layer of finely-divided solid material maintained in a turbulent condition superimposed by a gas phase containing a relatively low concentration of solids therein, upwardly through a second layer of finely-divided solid material at a velocity controlled to maintain said second layer in a turbulent condition, passing a cooling fluid in indirect heat exchange with the second layer of finely-divided material to thereby extract heat therefrom, controlling the temperature of said second layer to materially reduce the temperature of said hot, gaseous products, separating entrained solid material from the gas stream leaving said second layer, and withdrawing finely-divided material from said second layer separately and independently of the gas stream leaving said second layer.

11. In a process according to claim 10 wherein the entrained solid material separated from the gas stream leaving said second layer is returned to said second layer.

12. In a process for the regeneration of finely-divided solid material wherein said solid material is subjected to oxidizing conditions in a regenerating zone to remove combustible deposits formed thereon and wherein the regeneration gases removed from said regenerating zone are at a relatively high temperature and contain entrained solid material, the improvement in the process of separating the entrained solids therefrom which comprises passing the regenerating gases removed from the regenerating zone while substantially at regeneration temperature upwardly through a layer of cool finely-divided solid material maintained in a turbulent condition, said layer being at a temperature materially below the temperature of said regenerating zone whereby the temperature of said regeneration gas is materially reduced and heat is absorbed by the layer of solid material, transferring the heat absorbed by said layer of finely-divided material to an oxidizing gas, thereafter passing said oxidizing gas through said regenerating zone to burn combustible deposits from said solid material and thereafter separating entrained solid material from the regenerating gas after passing through said layer.

CHARLES E. JAHNIG.

REFERENCES CITED

The following references are of record in the file of this patent:

UNITED STATES PATENTS

| Number | Name | Date |
| --- | --- | --- |
| 2,273,075 | Weems | Feb. 17, 1942 |
| 2,302,209 | Goddin | Nov. 17, 1942 |
| 2,303,047 | Hemminger | Nov. 24, 1942 |
| 2,311,564 | Munday | Feb. 16, 1943 |
| 2,311,984 | Guild | Feb. 23, 1943 |
| 2,065,643 | Brandt | Dec. 29, 1936 |
| 1,178,667 | Niewerth | Apr. 11, 1916 |
| 2,327,175 | Conn | Aug. 17, 1943 |
| 2,345,487 | Liedholm | Mar. 28, 1944 |
| 2,337,684 | Scheineman | Dec. 28, 1943 |
| 770,787 | Thomson | Sept. 27, 1904 |

FOREIGN PATENTS

| Number | Country | Date |
| --- | --- | --- |
| 115,689 | Australia | Aug. 20, 1942 |